United States Patent [19]

Nelson et al.

[11] Patent Number: 4,776,994

[45] Date of Patent: Oct. 11, 1988

[54] METHOD OF MAKING A STRUCTURE FROM CARBONACEOUS FIBERS

[75] Inventors: Daniel C. Nelson, Old Orchard Beach; Roger T. Pepper, Scarborough, both of Me.

[73] Assignee: Fiber Materials, Inc., Biddeford, Me.

[21] Appl. No.: 899,021

[22] Filed: Aug. 22, 1986

Related U.S. Application Data

[63] Continuation-in-part of Ser. No. 714,925, Mar. 22, 1985, abandoned.

[51] Int. Cl.$^4$ .............................................. D01F 9/12
[52] U.S. Cl. .............................. 264/29.2; 264/29.5; 264/134; 264/136; 264/174; 264/176.1; 264/265; 264/344; 264/570; 264/257; 264/266; 264/123; 264/125; 8/130.1; 208/45; 423/447.4
[58] Field of Search ............... 264/211.19, 211.16, 264/203, 129, 134, 300, 344, 29.2, 29.5, 136, 174, 176.1, 265, 266, 570, 257, 123, 125; 208/45; 423/445, 449, 447.1, 447.4, 447.6, 447.9; 8/130.1

[56] References Cited

U.S. PATENT DOCUMENTS

| | | | |
|---|---|---|---|
| 3,817,700 | 6/1974 | Menikheim . | |
| 3,927,186 | 12/1975 | Vinton et al. | 423/445 |
| 4,284,615 | 8/1981 | Maruyama | 423/447.4 |
| 4,350,672 | 9/1982 | Layden, Sr. et al. | 423/445 |

OTHER PUBLICATIONS

DTIC Technical Report AD-765.497, "Devel of High Modulus Carbon Fiber Tape", and Composites, United Aircraft Research Labs., 5/73.

"Carbon and Graphite Fibers"; Sittig, Moyes Data Corp., 1980, p. 27.
"Technology of Carbon and Graphite Fiber Components", Delmonte, Van Nostrand, 1981, pp. 52-53.
"Gas Evolution Processes During the Formation of Carbon Fibers", Bromley, Intl Conf on Carbon Fibers, the Composites and Applications, London, 1971, The Plastics Institute.

*Primary Examiner*—Jan H. Silbaugh
*Assistant Examiner*—Hubert C. Lorin
*Attorney, Agent, or Firm*—Schiller, Pandiscio & Kusmer

[57] ABSTRACT

A carbonizable body is formed by infusing a plurality of preoxidized, preferably stabilized by known processing to have about 17 to 30 weight percent oxygen, fibers prepared from pitch, in a non-polar liquid plasticizer, typically quinoline, capable of extracting a tarry leachate from the fibers. The infusion of the fibers in the plasticizer is continued for a sufficient time for a substantial amount of leachate to form on the surface of the fibers. The treated fibers are then consolidated or diffusion-bonded to one another or other fibers, as by orienting the treated fibers in a mold and subjecting them to isostatic pressing at relatively low temperatures and pressure. Further processing of the consolidated fibers with appropriate heat treatment in an inert atmosphere will produce a carbonized bulk product with higher values of Young's modulus for the carbonized material than have been previously achieved at such carbonization temperatures. This carbonaceous product can be truly graphitized by subsequent heat treatment to obtain material with a modulus of at least $40 \times 10^6$ psi, and a tensile strength of at least $20 \times 10^3$ psi.

15 Claims, No Drawings

METHOD OF MAKING A STRUCTURE FROM CARBONACEOUS FIBERS

This application is a continuation-in-part of copending U.S. patent application Ser. No. 714,925, filed Mar. 22, 1985, now abandoned.

The present invention relates to carbon materials and more particularly graphite bulk articles formed by the pyrolysis of a plurality of consolidated carbonaceous fibers, particularly pitch fibers.

Carbon-carbon composites are generally carbon matrices reinforced with carbon fibers aligned or distributed therein. Such composites have been formed by a variety of methods, usually involving the impregnation of a porous carbon fiber structure with a resin, pyrolytic carbon or the like. For example, a mat, felt, tow or the like of carbon fibers may be impregnated by a pressure or evacuation technique with a binder of pitch or a synthetic carbon-yielding resin that is subsequently polymerized. The impregnated body is then pyrolyzed by heating to temperatures sufficiently high to convert the impregnant binder to a carbon matrix.

Alternatively, a carbon matrix can be formed by impregnating a porous, carbon fiber body with a hydrocarbon gas that is then thermally decomposed to carbon. In either case, the carbonized body can be reimpregnated and repyrolyzed to increase density and improve other properties. The resulting carbon matrix, however, is generally not well bonded to the fibers because of shrinking of the matrix during pyrolysis. Further, the composite often tends to have a coarse structure with significant residual porosity and low Young's modulus.

In prior art manufacturing of carbon fibers, it is often preferred from a cost standpoint to use precursor fibers of pitch. As is well known, such fibers for use in carbon composites are usually made by spinning a fiber from typically a petroleum, coal tar or acenaphthylene pitch, preferably containing a large proportion of mesophase pitch. The fibers are then thermoset or heat-stabilized by heating in an oxygen-containing atmosphere from about 270° to 390° C. to render the fiber infusible, usually when a desired oxygen content, usually between about 17 to 30 weight percent, preferably around 20 weight percent, is achieved. Such heat-stabilized, oxygen-containing pitch fibers are known as preoxidized fibers.

Preoxidized pitch fibers, when heated in an oxygen-free atmosphere at temperatures greater than about 1500° C., will be carbonized, and if then heated in the range of about 2500° C. to 3300° C. will become graphitic. Graphitic carbon fibers made from pitch have a well ordered structure and will typically provide graphite "planes" that are substantially all radially disposed out to the fiber surface. The density of such graphitic pitch fibers will typically be about 2.1 to 2.2 g/cc.

The present invention constitutes an improved approach to the problem of using the expensive multiple cycle matrix impregnation/graphitization processing heretofore required to provide carbon bodies, and also results in high values of Young's modulus, not heretofore achieved in carbon-carbon bodies. To these ends, the binder material employed in the present invention is derived in situ directly from preoxidized pitch fibers themselves. The binder material is formed by infiltrating a plurality of preoxidized pitch fibers with a liquid non-polar plasticizer, the plasticizer and fibers reacting with one another to extract or leach a tarry leachate from the infiltrated fibers and coating the latter. The coated fibers are then consolidated or diffusion bonded to one another at high pressure, typically at a temperature below 400° C. as by pressing, hot isostatic pressing, autoclaving, extrusion or the like. After diffusion bonding, the bulk material formed is no longer fibrous in nature, but the bulk structure substantially retains the axial molecular orientation of the original fibers. This bulk material can be carbonized at atmospheric pressure.

In an important aspect of the present invention, the coated fibers are both consolidated and pyrolyzed, for example at 600° C. under pressure, all preferably by hot isostatic pressing (HIP), while avoiding cooling between consolidation and pyrolysis. After the HIP process is complete, again the bulk material formed is no longer fibrous in nature, but the bulk structure substantially retains the molecular orientation of the original fibers. This bulk material can be carbonized at lower temperatures than those heretofore required to obtain a given value of Young's modulus for the carbonized material.

A principal object of the present invention is therefore to provide a method of forming a bulk carbon structure from preoxidized fibers, which structure has a high modulus of elasticity. Yet another object of the present invention is to provide a bulk carbon structure from precursor preoxidized fibers, which structure is not grossly fibrous but retains the molecular orientation characteristic of the preoxidized fibers, and therefore can be carbonized or graphitized to produce high strength, high modulus bulk carbon or graphite bodies with minimal cracking.

Other objects of the present invention are to provide such a method wherein preoxidized fibers are infused with a plasticizer to form a tarry exudate that serves as a binder in a subsequent consolidation step, and to provide such a method wherein the plasticizer employed is capable of extracting a tarry leachate from the infused preoxidized fibers, and thus avoids the need to add any matrix material to the resulting carbon body.

Yet other objects of the present invention will in part be obvious and will in part appear hereinafter. The invention accordingly comprises the processes comprising the several steps and relation of one or more of such steps with respect to the others, and the products and compositions possessing the features, properties and relation of elements, all of which are exemplified in the following detailed disclosure and the scope of the application of which will be indicated in the claims.

For a fuller understanding of the nature and objects of the present invention, reference should be had to the following detailed description.

Generally, in the process of the present invention, a plurality of preoxidized pitch fibers are infused, preferably to saturation, with a non-polar liquid plasticizer capable of extracting a tarry leachate from the fibers. The plasticizer can be any of a large number of non-polar solvents such as benzene, substituted benzenes, pyridine, quinoline, quinoline derivatives and the like.

The fibers may be any carbonaceous pitch precursor such as those formed of petroleum, coal tar or acenaphthylene pitch, and the like. For example, typical precursor fibers are Ashland Carboflex stabilized fibers prepared from Ashland A240 pitch, and many others. The precursor fibers should be stabilized by known processing to have about 17 to 30 weight percent oxygen.

The infusion of preoxidized fibers in the plasticizer is continued at a temperature above, at or below the boiling point of the plasticizer for a sufficient time for a substantial amount of leachate to form on the surface of the fibers, i.e. until the pre-oxidized fibers have imbibed at least 5 percent and up to as much as 80 percent by weight of the plasticizer in terms of the fiber weight. The minimum infusion time is, inter alia, a function of the fiber diameters and the infusion temperature and pressure. It is believed that during this period, the infused plasticizer extracts short fragments from the interior of the fiber, which fragments were formed during the oxidation process. The exact composition of the tarry exudate is not known, but it is in the form of a dark, viscous, sticky fluid. The infiltrated plasticizer also casses some swelling and softening of the preoxidized fibers, rendering them more flexible.

After the preoxidized fibers have been appropriately infused with plasticizer to form the desired exudate on the fiber surfaces, a plurality of the treated fibers can then be readily consolidated or diffusion-bonded to one another or other fibers by a variety of techniques at comparatively low temperatures and pressures, e.g. as low as 200° C. and 2000 psi. Bonding can be achieved statically by orienting a plurality of the treated fibers in a mold and subjecting them to isostatic pressing at relatively low temperatures and pressure. On removal of the pressed product from the press enclosure, some residual exudate may remain behind. Unlike the prior art, however, because of the high plasticity given to the fibers by their swollen and softened state when treated according to the present invention, and the presence of the binding exudate, a plurality of the treated fibers may be consolidated by the dynamic process of hot extrusion. The resulting bulk structure also shows little or no gross fiber/matrix differentiation or clear boundaries characteristic of prior art composites.

Further processing of the consolidated fibers is desireable to fully utilize the infusion treatment of the present invention. The shaped product produced by consolidating the leached and coated preoxidized fibers possesses the strength and modulus of the original preoxidized fibers. However, this material is convertible to a higher modulus (e.g. at least $40 \times 10^6$ psi) and higher strength (e.g. at least $20 \times 10^3$ psi) carbon body with appropriate heat treatment in an inert atmosphere. Such heat treatments are generally determined by the end properties and shape configurations desired, and in general call for gradual heating up to between 1400° C. and 3200° C. for maximum strength and stiffness. Slow heating that avoids sudden release of volatiles within the structure, and maintenance of the shaped product under pressure during the carbonization cycle, both serve to reduce or minimize crack formation in the resulting carbonized bulk product.

The infiltrated preoxidized fibers coated with the leachate of the present invention can also be utilized as a matrix precursor with fully carbonized or graphitized fibers as a conventional reinforcement. For example, one can prepare a composite layup of alternate layers of carbonized or graphitized fibers with preoxidized pitch fibers. The entire layup may be infused with plasticizer according to the teachings of the present invention to produce a leachate in situ, or the preoxidized fibers can be pretreated in like manner prior to forming the layup. In either instance, the resulting layup is then consolidated at low temperatures and pressures using standard platen pressing, hot isostatic pressing, autoclave or extrusion techniques. Final firing of the composites is then carried out to the required carbonization or graphitization temperature in an inert atmosphere. The layups can comprise aligned or random carbon fibers in a matrix precursor of aligned or randomly oriented preoxidized fibers. The matrix formed from the treated preoxidized fibers, being highly molecularly oriented, provides additional strength and stiffness, and also permits greater control of the relative thermal expansion values of the matrix and reinforced material.

As noted above, an important variation of the present invention is the concurrent consolidation and pyrolysis of the infused fibers. For this variation, importantly the preoxidized precursor fibers are stabilized to have an oxygen content of between about 17 to 30 weight percent for reasons elucidated later herein. In the preferred process, these preoxidized fibers in the form of tops, yarns, tows and the like are laid up unidirectionally and pulled into a plastic envelope or tube, typically of polytetrafluorethylene, polyolefin heat shrinkable material or the like. The fibers can thus be packed into the envelope to a 55 to 60% fiber volume maximally. In order to improve the packing density, the packed envelope may be inserted into a metal tube, (typically stainless steel with a 0.050" wall, 1½" outside diameter) and the latter drawn through a series of metal-drawing dies (e.g. 5 dies are required to provide a reduced outside diameter of about 1.1"). This serves to increase the fiber volume inside the envelope to as high as 75 to 80%.

The metal jacket is then removed, as by machining, and the compressed plastic tube is cut into short lengths, typically 9". One or more of these lengths is placed in a plastic bag (e.g. prepared from 1 mil polytetrafluorethylene film). A non-polar plasticizer, for example quinoline, up to 70 weight percent with reference to the fiber weight, is added to the bag and the fiber is allowed to soak. It has been found that if the oyygen content of the preoxidized fibers is less than about 17 weight percent, the fibers may dissolve in the plasticizer on heating, leaving no fibrous structure. On the other hand, if the oxygen content of the fibers is greater than about 30 weight percent, the reaction between the fibers and the plasticizer may be too slow or insufficient.

Following infusion of the fibers by the plasticizer, the bag is closed and placed in an open metal can, e.g. of 20 gauge stainless steel, and held in spaced relationship from the bottom of the can by an appropriate steel barrier or tool. The can is then filled with a pressure transfer medium such as comminuted refractory material (e.g. carbon black, sand or the like) or a metal alloy such as PbBi that preferably melts at a low temperature. In using such alloy, one simply pours the liquid metal in the can containing the specimen and allows it to chill cast. The can with the spaced specimen trapped in the frozen metal is then placed in the pressure vessel. It will be appreciated that in loading the can with the transfer medium, the latter surrounds the bag in whole or in part. Thus when the can and contents are subjected to heat and pressure in the pressure vessel, isostatic compaction of the specimen occurs. Gaseous reaction products bubble through or diffuse to the surface of the molten pressure transfer medium. The use of metal alloy is preferred because it is easy to use, chill casts, and being rendered liquid at reasonably low temperature, accomodates well for shrinkage of the sample incurred in the subsequent processing.

In order to effect consolidation of the infused fibers and subsequent pyrolysis, the can with its contents is then preferably subjected to hot isostatic pressing at pressures that may be as high as 15,000 psi and at temperatures brought up to above 400° C. at a relatively slow rate, e.g. 20° C./hour. Where the transfer medium is a metal alloy, the latter is selected to be molten at the temperature at which consolidation occurs, e.g. from about 150° C. to 300° C. Above those temperatures, the consolidated specimen will pyrolize to basically form a carbon body. It is important to avoid both depressurization and cooling of the sample between consolidation and pyrolysis, because pyrolysis under pressure yields samples with fewer cracks. During pyrolysis, the specimen decomposes in part to yield a number of gases, such as methane and carbon monoxide, which collect within the can, ultimately providing a shrunken carbon skeleton.

The can is allowed to cool under pressure to below about 200° C. before removal from the pressure vessel. To remove contents of the can, one need only remelt the alloy surrounding the specimen thereby permitting the specimen and any holder to rise to the surface of the molten metal.

It is hypothesized that in this hot isostatic processing, as evidenced by the low carbon yields and microstructure of the resulting product, the less stable center regions of the preoxidized pitch fibers are "squeezed out" during consolidation and pyrolysis. The result following graphitization, is that there is a predominantly lamellar microstructure consisting of ribbons extending several fiber diameters in the off-axis direction that have a general alignment in the longitudinal axis of the product. High axial modulus, high transverse modulus and high shear strength result from this graphitic structure.

For a better understanding of the present invention, representative examples are given as follows, all percentages being by weight unless otherwise indicated. Densities of samples were measured by the Archimedes technique, typically using propanol to infiltrate the sample pores, to provide apparent densities.

EXAMPLE I

A preform, about 50" in length, of preoxidized pitch fiber (Ashland Co.) was wrapped on a vertical frame in a unidirectional fashion, pulled into a tube (2" internal diameter) made of polyolefin shrink-tubing material, and heated to 125° C. until the tubing had shrunk to a 1" diameter. A 9" specimen, cut from the filled tube, was plasticized by absorption of quinoline in an amount of about 60% of the dry weight of the fiber, and sealed in a bag formed of polytetrafluorethylene film.

The bag was inserted into a stainless steel can and surrounded with molten PbBi alloy that was allowed to set. The can was then hot isostatically pressed at about $15 \times 10^3$ psi, while the temperature was increased from room temperature to 600° C. at a rate of about 5° C./15 minutes. The pressure and temperature were then reduced to permit removal of the specimen from the can and alloy. Following removal of the specimen from the press, the specimen was subjected to high temperature pyrolysis up to 2500° C. under argon in a closed-atmosphere, quartz and graphite apparatus utilizing a Westinghouse R/F Generator as an inductive heat source. After an initial thorough atmosphere purge with argon, heating was initiated, bringing the specimen from room temperature (27° C.) to 2500° C. at a rate of 100° C./hour. The specimen was allowed to slowly cool in the furnace under the argon.

Following heat treatment, the density of the specimen was measured in an isopropyl alcohol solution and found to be 2.00 g/cc.

Since certain changes may be made in the above described processes and products without departing from the scope of the inventions herein involved, it is intended that all matter contained in the above description or shown in the accompanying drawing shall be interpreted in an illustrative and not in a limiting sense.

What is claimed is:

1. A method of forming a structure from preoxidized carbonaceous fibers, said method comprising the steps of:
    infusing a plurality of said fibers with a non-polar liquid plasticizer capable of extracting a tarry leachate from the infused fibers;
    maintaining said infused fibers in said plasticizer until said leachate forms a coating on the surfaces of said infused fibers; and
    diffusion bonding said plurality of infused fibers and leachate together into carbonizable structure.

2. A method as defined in claim 1 wherein said preoxidized fibers have between about 17 to 30 weight percent oxygen.

3. A method as defined in claim 1 wherein said fibers are infused until they have imbibed at least 5 and up to as much as 80 percent by weight of the plasticizer in terms of the fiber weight.

4. A method as defined in claim 1 wherein said diffusion bonding comprises a step of hot isostatically pressing said infused fibers and leachate.

5. A method as defined in claim 1 wherein said carbonaceous fibers are pitch fibers formed of petroleum, coal tar or acenaphthylene pitch.

6. A method as defined in claim 1 wherein said fibers are preoxidized pitch fibers.

7. A method as defined in claim 6 wherein said plasticizer is quinoline.

8. A method as defined in claim 1 wherein said non-polar liquid plasticizer is selected from the group consisting of benzene, substituted benzenes, pyridine, quinoline, and quinoline derivatives.

9. A method as defined in claim 1 including a step of heating said carbonizable structure at a temperature and for a time sufficient to carbonize said carbonizable structure.

10. A method as defined in claim 9 wherein said steps of diffusion bonding and heating are carried out concurrently.

11. A method as defined in claim 10 wherein said steps of diffusion bonding and heating comprise pressing said plurality of infused fibers and leachate together at a pressure sufficient to consolidate said fibers and leachate into said carbonizable structure, and providing a temperature gradient at said pressure to raise the temperature of said structure to a level sufficient to pyrolize said fibers and leachate to carbonize said carbonizable structure.

12. A method as defined in claim 11 wherein said pressure is substantially isostatic.

13. A method as defined in claim 9 including the step of heat treating the carbonized structure in an inert atmosphere at a temperature and for a time sufficient to convert said carbonized structure to substantially a graphitic structure.

14. A method as defined in claim 1 wherein said diffusion bonding comprises a step of extrusion molding said infused fibers and leachate.

15. A method as defined in claim 1 wherein said preoxidized carbonaceous fibers have an oxygen content of between about 17 and 30 weight percent.

* * * * *

UNITED STATES PATENT AND TRADEMARK OFFICE
CERTIFICATE OF CORRECTION

PATENT NO. : 4,776,994

DATED : October 11, 1988

INVENTOR(S) : Daniel C. Nelson, et al.

It is certified that error appears in the above-identified patent and that said Letters Patent is hereby corrected as shown below:

Claim 11, column 6, line 48, insert -- hot -- before "pressing".

Signed and Sealed this

Twenty-first Day of February, 1989

Attest:

DONALD J. QUIGG

Attesting Officer

Commissioner of Patents and Trademarks